(12) United States Patent
Chen et al.

(10) Patent No.: US 12,532,382 B2
(45) Date of Patent: Jan. 20, 2026

(54) POWER SAVING BY RRC INACTIVITY TIMER ONLINE LEARNING AND ADAPTIVE RRC CONNECTION RELEASE

(71) Applicant: MediaTek Singapore Pte. Ltd., Singapore (SG)

(72) Inventors: Hung-Yueh Chen, Seongnam-si (KR); Byeng Hyun Kim, Seongnam-si (KR); Jung Shup Shin, Seongnam-si (KR); Hyunsuk Jang, Seongnam-si (KR); Youngwoo Lee, Seongnam-si (KR); Sangho Park, Seongnam-si (KR); Jingwon Lee, Seongnam-si (KR); Sanghyun Yun, Seongnam-si (KR); Yujin Lee, Seongnam-si (KR)

(73) Assignee: MediaTek Singapore Pte. Ltd., Singapore (SG)

( * ) Notice: Subject to any disclaimer, the term of this patent is extended or adjusted under 35 U.S.C. 154(b) by 316 days.

(21) Appl. No.: 18/229,314

(22) Filed: Aug. 2, 2023

(65) Prior Publication Data
US 2025/0048492 A1 Feb. 6, 2025

(51) Int. Cl.
*H04W 76/38* (2018.01)
*H04W 52/02* (2009.01)
*H04W 76/20* (2018.01)
*H04W 76/27* (2018.01)

(52) U.S. Cl.
CPC ........... *H04W 76/38* (2018.02); *H04W 76/20* (2018.02)

(58) Field of Classification Search
CPC ...... H04W 76/38; H04W 76/20; H04W 76/27
USPC .................................................. 370/329-330
See application file for complete search history.

(56) References Cited

U.S. PATENT DOCUMENTS

| | | | |
|---|---|---|---|
| 2018/0220486 A1* | 8/2018 | Tseng | H04W 36/305 |
| 2023/0199911 A1* | 6/2023 | Jung | H04W 8/186 370/329 |
| 2023/0276532 A1* | 8/2023 | Yang | H04W 52/0251 370/329 |
| 2024/0298377 A1* | 9/2024 | Lee | H04W 76/30 |

* cited by examiner

*Primary Examiner* — Candal Elpenord
(74) *Attorney, Agent, or Firm* — Andy M. Han; Han IP PLLC

(57) ABSTRACT

Techniques pertaining to power saving by radio resource control (RRC) inactivity timer online learning and adaptive RRC connection release in wireless communications are described. A user equipment (UE) determines to trigger a radio resource control (RRC) connection release with a network responsive to a condition being met. The UE then triggers the RRC connection release. The condition involves a duration of zero throughput being longer than a sum of a RRC inactivity timer duration plus a first threshold.

18 Claims, 10 Drawing Sheets

900

DETERMINE, BY A PROCESSOR OF A USER EQUIPMENT (UE), TO TRIGGER A RADIO RESOURCE CONTROL (RRC) CONNECTION RELEASE WITH A NETWORK RESPONSIVE TO A CONDITION BEING MET, THE CONDITION INVOLVING A DURATION OF ZERO THROUGHPUT BEING LONGER THAN A SUM OF A RRC INACTIVITY TIMER DURATION PLUS A FIRST THRESHOLD
910

TRIGGER, BY THE PROCESSOR, THE RRC CONNECTION RELEASE
920

POWER SAVING BY RRC INACTIVITY TIMER ONLINE LEARNING AND ADAPTIVE RRC CONNECTION RELEASE

TECHNICAL FIELD

The present disclosure is generally related to wireless communications and, more particularly, to power saving by radio resource control (RRC) inactivity timer online learning and adaptive RRC connection release in wireless communications.

BACKGROUND

Unless otherwise indicated herein, approaches described in this section are not prior art to the claims listed below and are not admitted as prior art by inclusion in this section.

In wireless communications, such as mobile communications under the 3rd Generation Partnership Project (3GPP) specification(s) for 5th Generation (5G) New Radio (NR), a radio resource control (RRC) inactivity timer on the network side expires when there is no uplink (UL) and downlink (DL) data for a predefined period (e.g., 10 seconds). Upon expiry of the RRC inactivity timer, the network triggers RRC connection release with a user equipment (UE). As UEs are typically battery-powered, power saving is one of the most important features for UEs. However, sometimes the network does not release an RRC connection immediately upon expiry of the RRC inactivity timer. That is, the network may delay RRC connection release in case there is an ongoing RRC procedure (which could be unnecessary). For example, this could happen from secondary cell group (SCG) setup to SCG release while uplink (UL) and downlink (DL) throughput is 0, and this scenario would cause unnecessary power consumption on the part of the UE. Therefore, there is a need for a solution of power saving, such as power saving by RRC inactivity timer online learning and adaptive RRC connection release.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

An objective of the present disclosure is to propose solutions or schemes that address the issue(s) described herein. More specifically, various schemes proposed in the present disclosure are believed to provide solutions involving power saving by RRC inactivity timer online learning and adaptive RRC connection release in wireless communications. It is believed that implementations of various proposed schemes in accordance with the present disclosure may address or otherwise alleviate aforementioned issue(s) (e.g., by RRC inactivity timer online learning and/or adaptive UE-triggering RRC connection release).

In one aspect, a method may involve a UE determining to trigger an RRC connection release with a network responsive to a condition being met. The method may also involve the UE triggering the RRC connection release. The condition may involve a duration of zero throughput being longer than a sum of a RRC inactivity timer duration plus a first threshold.

In another aspect, a method may involve a UE maintaining a first-in-first-out (FIFO) queue of a plurality of values each representative of a respective continuous duration of no uplink (UL) and downlink (DL) data before an RRC state transition from a connected state to an idle state. The method may also involve the UE determining a learned RRC inactivity timer duration based on the values stored in the FIFO queue. The method may further involve the UE determining to trigger an RRC connection release with a network responsive to a condition being met. The method may additionally involve the UE triggering the RRC connection release by: (a) triggering the network to release a RRC connection with the UE; or (b) performing a local release after one or more times of attempting to trigger the network to release the RRC connection. The condition may involve a duration of zero throughput being longer than a sum of the learned RRC inactivity timer duration plus a first threshold.

In yet another aspect, an apparatus implementable in a UE may include a transceiver configured to communicate wirelessly and a processor coupled to the transceiver. The processor may determine to trigger an RRC connection release with a network responsive to a condition being met. The processor may also trigger the RRC connection release. The condition may involve a duration of zero throughput being longer than a sum of a RRC inactivity timer duration plus a first threshold.

It is noteworthy that, although description provided herein may be in the context of certain radio access technologies, networks and network topologies such as 5G/NR mobile communications, the proposed concepts, schemes and any variation(s)/derivative(s) thereof may be implemented in, for and by other types of radio access technologies, networks and network topologies such as, for example and without limitation, Evolved Packet System (EPS), Long-Term Evolution (LTE), LTE-Advanced, LTE-Advanced Pro, Internet-of-Things (IoT), Narrow Band Internet of Things (NB-IoT), Industrial Internet of Things (IIoT), vehicle-to-everything (V2X), and non-terrestrial network (NTN) communications. Thus, the scope of the present disclosure is not limited to the examples described herein.

BRIEF DESCRIPTION OF THE DRAWINGS

The accompanying drawings are included to provide a further understanding of the disclosure and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation in order to clearly illustrate the concept of the present disclosure.

DETAILED DESCRIPTION OF PREFERRED IMPLEMENTATIONS

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

Overview

Implementations in accordance with the present disclosure relate to various techniques, methods, schemes and/or solutions pertaining to power saving by RRC inactivity timer online learning and adaptive RRC connection release in wireless communications. According to the present disclosure, a number of possible solutions may be implemented separately or jointly. That is, although these possible solutions may be described below separately, two or more of these possible solutions may be implemented in one combination or another.

Figure 1:
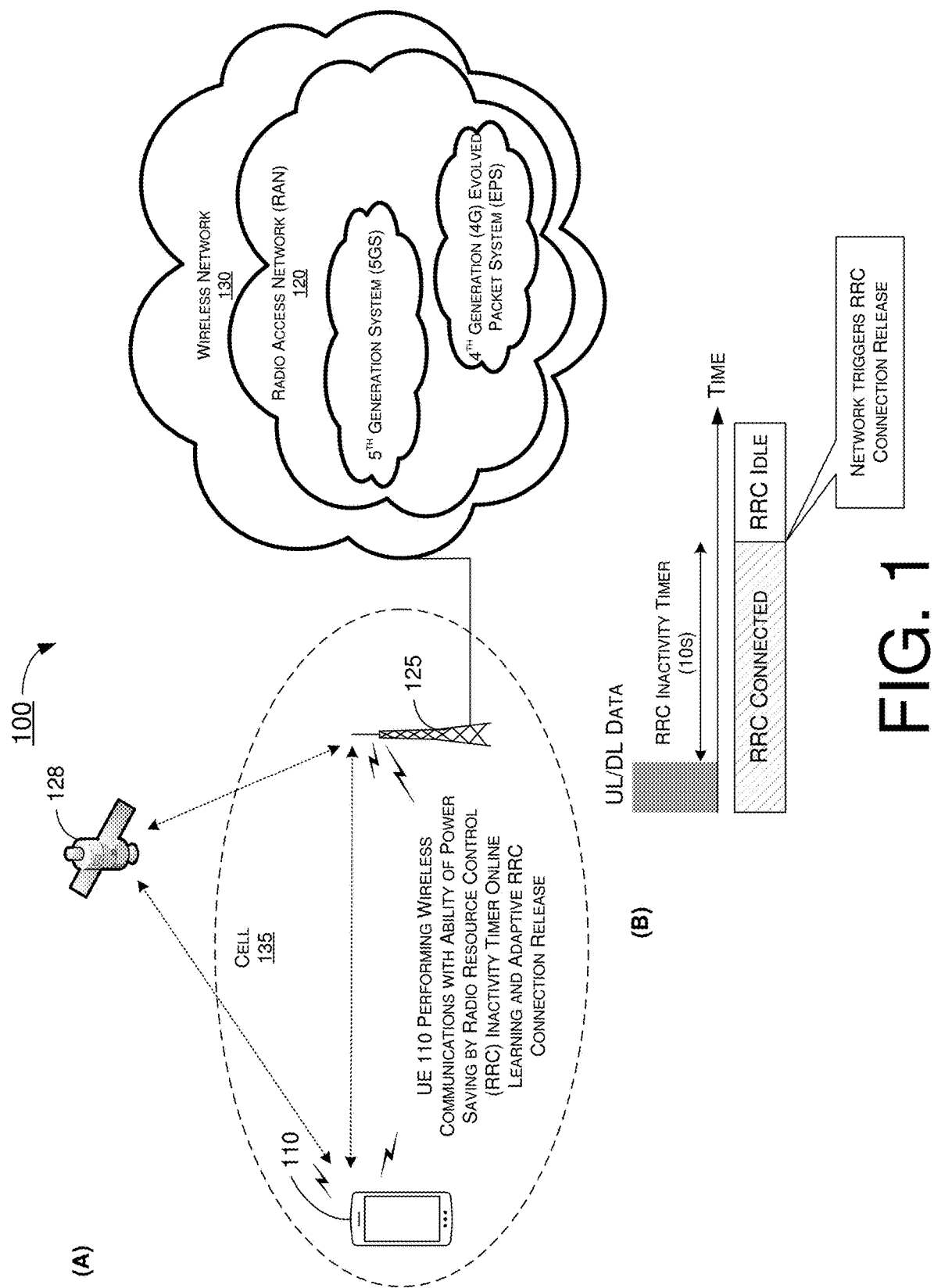
FIG. 1 is a diagram of an example network environment in which various proposed schemes in accordance with the present disclosure may be implemented.

FIG. 1 illustrates an example network environment 100 in which various solutions and schemes in accordance with the present disclosure may be implemented. FIG. 2~FIG. 10 illustrate examples of implementation of various proposed schemes in network environment 100 in accordance with the present disclosure. The following description of various proposed schemes is provided with reference to FIG. 1~FIG. 10.

Referring to part (A) FIG. 1, network environment 100 may involve a UE 110 in wireless communication with a RAN 120 (e.g., a 5G NR mobile network or another type of network such as an NTN). UE 110 may be in wireless communication with RAN 120 via a base station or network node 125 (e.g., an eNB, gNB or transmit-receive point (TRP)) and/or a non-terrestrial network node 128 (e.g., a satellite). That is, UE 110 may be within coverage of a cell 135 associated with terrestrial network node 125 or non-terrestrial network node 128. RAN 120 may be a part of a network 130. Referring to part (B) of FIG. 1, UE 110 may be in an RRC connected state while an RRC inactivity timer is running (e.g., with a duration of 10 seconds) until expiry of the RRC inactivity timer, at which time network 130 may trigger (e.g., via terrestrial network node 125 or non-terrestrial network node 128) an RRC connection release with UE 110 so that UE 110 may transition from the RRC connected state to an RRC idle state.

In network environment 100, UE 110 and network 130 (via terrestrial network node 125 or non-terrestrial network node 128 of RAN 120) may implement various schemes pertaining to power saving by RRC inactivity timer online learning and adaptive RRC connection release in wireless communications, as described below. It is noteworthy that, although various proposed schemes, options and approaches may be described individually below, in actual applications these proposed schemes, options and approaches may be implemented separately or jointly. That is, in some cases, each of one or more of the proposed schemes, options and approaches may be implemented individually or separately. In other cases, some or all of the proposed schemes, options and approaches may be implemented jointly.

It is noteworthy that, in the present disclosure, the term "D-NoDataBeforeIdle" refers to a continuous duration of no UL/DL data (e.g., no-data duration) before an RRC state transition to an idle state (from a connected state) in seconds. It is also noteworthy that, although various proposed schemes may be described below in the context of implementation in or by UE 110, the proposed schemes may also be implemented in the context of artificial intelligence (AI) such as, for example and without limitation, machine learning (ML).

Figure 2:
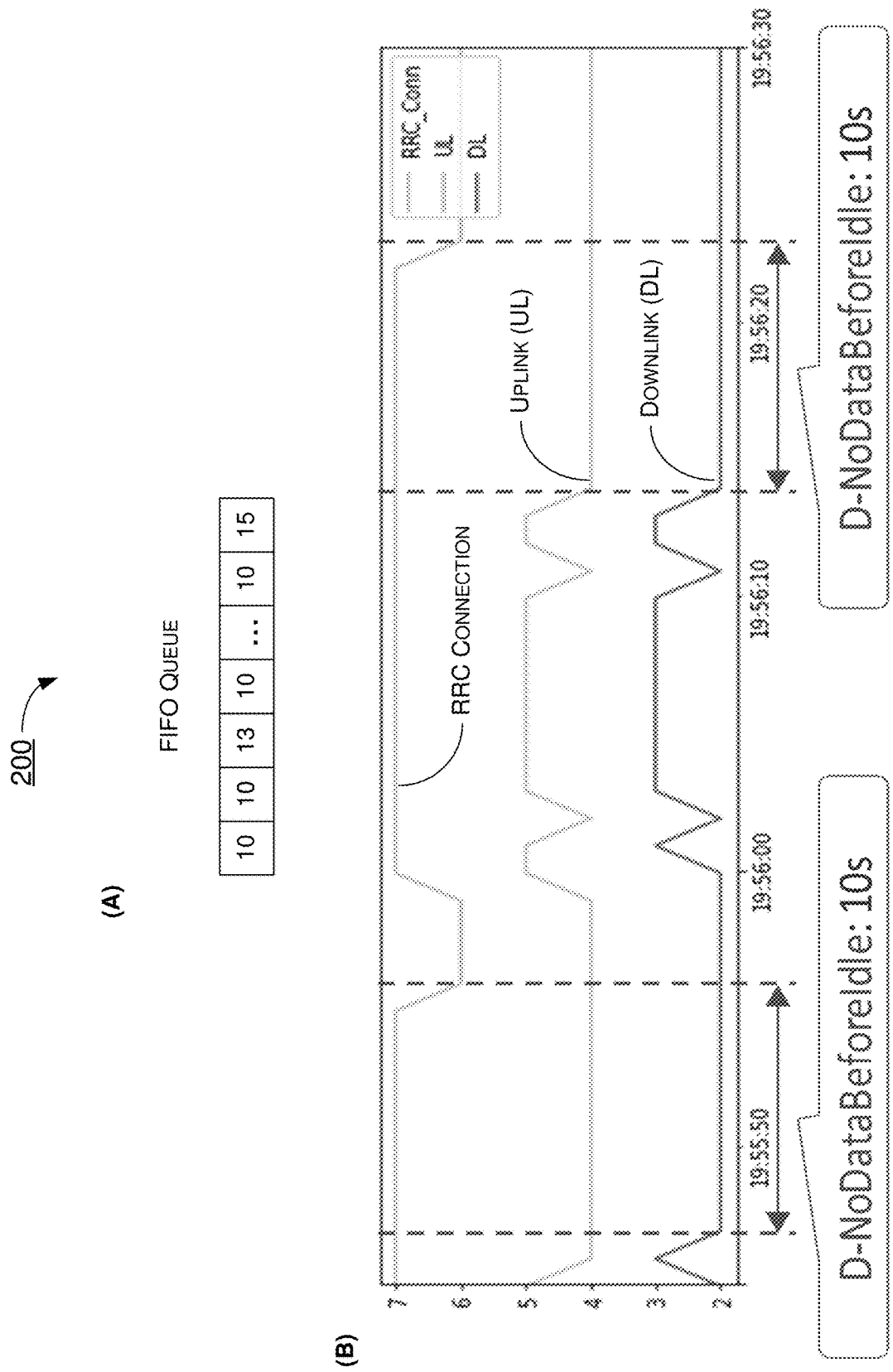
FIG. 2 is a diagram of an example scenario under a proposed scheme in accordance with the present disclosure.

FIG. 2 illustrates an example scenario 200 under a proposed scheme in accordance with the present disclosure. Under the proposed scheme, UE 110 may learn the value of RRC inactivity timer of network 130. For instance, UE 110 may maintain a first-in-first-out (FIFO) queue storing the latest D-NoDataBeforeIdle values, as shown in part (A) of FIG. 2. Under the proposed scheme, the D-NoDataBeforeIdle values may not be inserted into the FIFO queue in an event that RRC Idle is triggered by UE 110 (e.g., RRC connection local release or UEAssistanceInformation (UAI)). Alternatively, or additionally, the D-NoDataBeforeIdle values may not be inserted into the FIFO queue in an event that there is a lower-layer failure during the period of D-NoDataBeforeIdle. Alternatively, or additionally, the D-NoDataBeforeIdle values may not be inserted into the FIFO queue in an event that no user data is transmitted during the RRC Connection period (e.g., the RRC connection is established for signaling but not for user data transmission), as shown in part (B) of FIG. 2.

Figure 3:
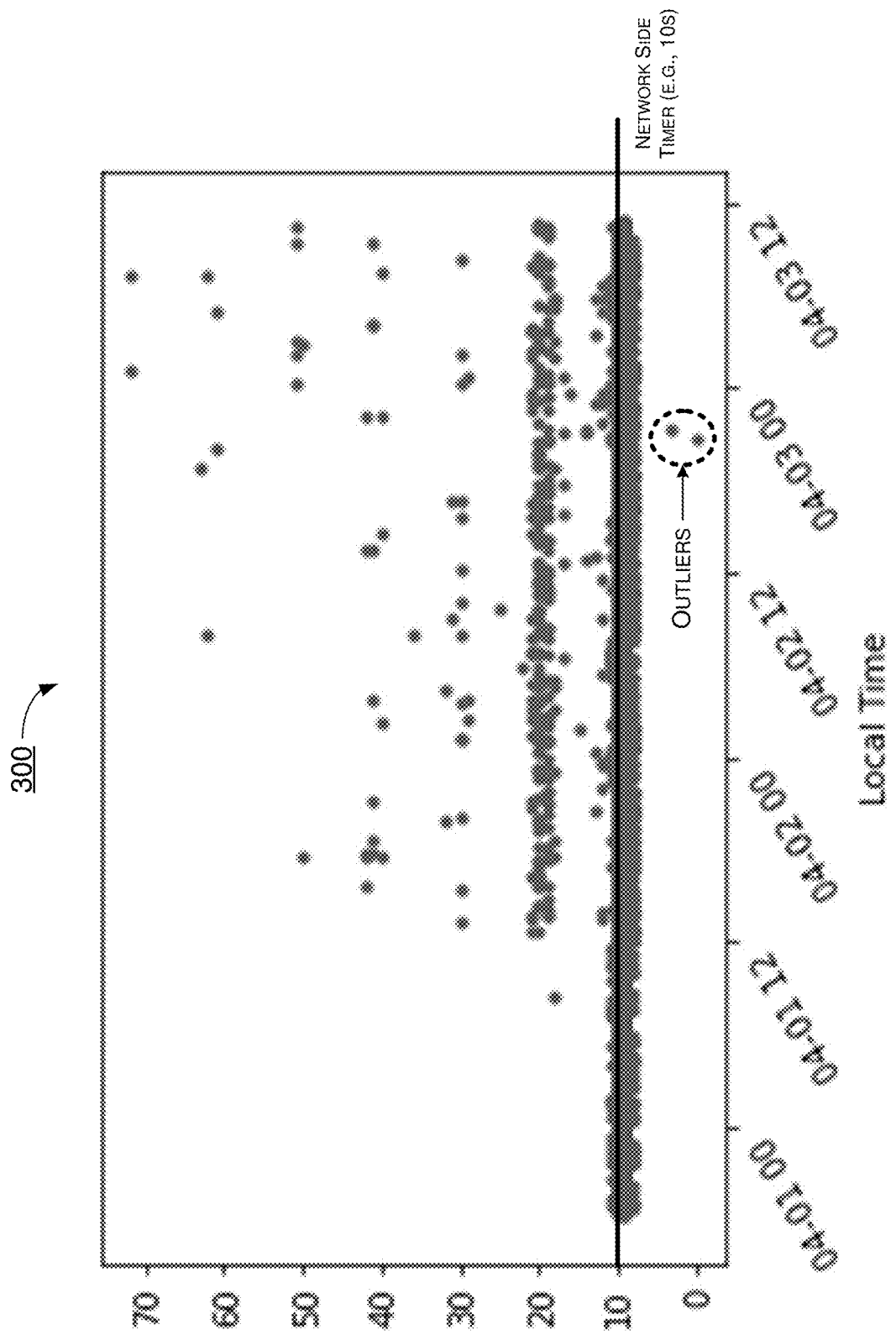
FIG. 3 is a diagram of an example scenario under a proposed scheme in accordance with the present disclosure.

FIG. 3 illustrates an example scenario 300 under a proposed scheme in accordance with the present disclosure. Under the proposed scheme, UE 110 may learn the value of RRC inactivity timer of network 130 and, when the number of stored D-NoDataBeforeIdle values exceed a predefined threshold, UE 110 may calculate the learned RRC inactivity timer duration based on the following mathematical expression: min (values stored in the FIFO queue)+an offset, where the offset may be 1 second or a different duration. Under the proposed scheme, UE 110 may optionally drop a predetermined percentage of the minimal D-NoDataBeforeIdle values to avoid including special values, as shown in FIG. 3. Moreover, in case that the calculated value is less than a predefined lower bound value (e.g., 8 seconds), the predefined lower bound value may be used instead to avoid the resultant value being skewed by outliers.

Under the proposed scheme, UE 110 may reset or otherwise initialize the FIFO queue in case of existence of one or more conditions. For instance, UE 110 may reset or otherwise initialize the FIFO queue when a location of UE 110 is changing (e.g., location area (LA) and/or tracking area (TA)

change or serving public land mobile network (PLMN) change). Moreover, UE 110 may reset or otherwise initialize the FIFO queue when the UE 110 is powered off (or when power is toggled off and back on) or when a flight mode is activated. Under the proposed scheme, UE 110 may optionally consider previously learned RRC inactivity timer as invalid when the FIFO queue is reset/initialized (and thus UE 110 may correspondingly reset or otherwise initialize the FIFO queue). Also, under the proposed scheme, a value representative of the learned RRC inactivity timer duration may be stored in a network vector (NV) (e.g., along with location information such as location area identifier (LAI), tracking area identifier (TAI) and/or PLMN). After reboot of UE 110, the learned RRC inactivity timer duration may be used in case that location of UE 110 is not changed.

Figure 4:
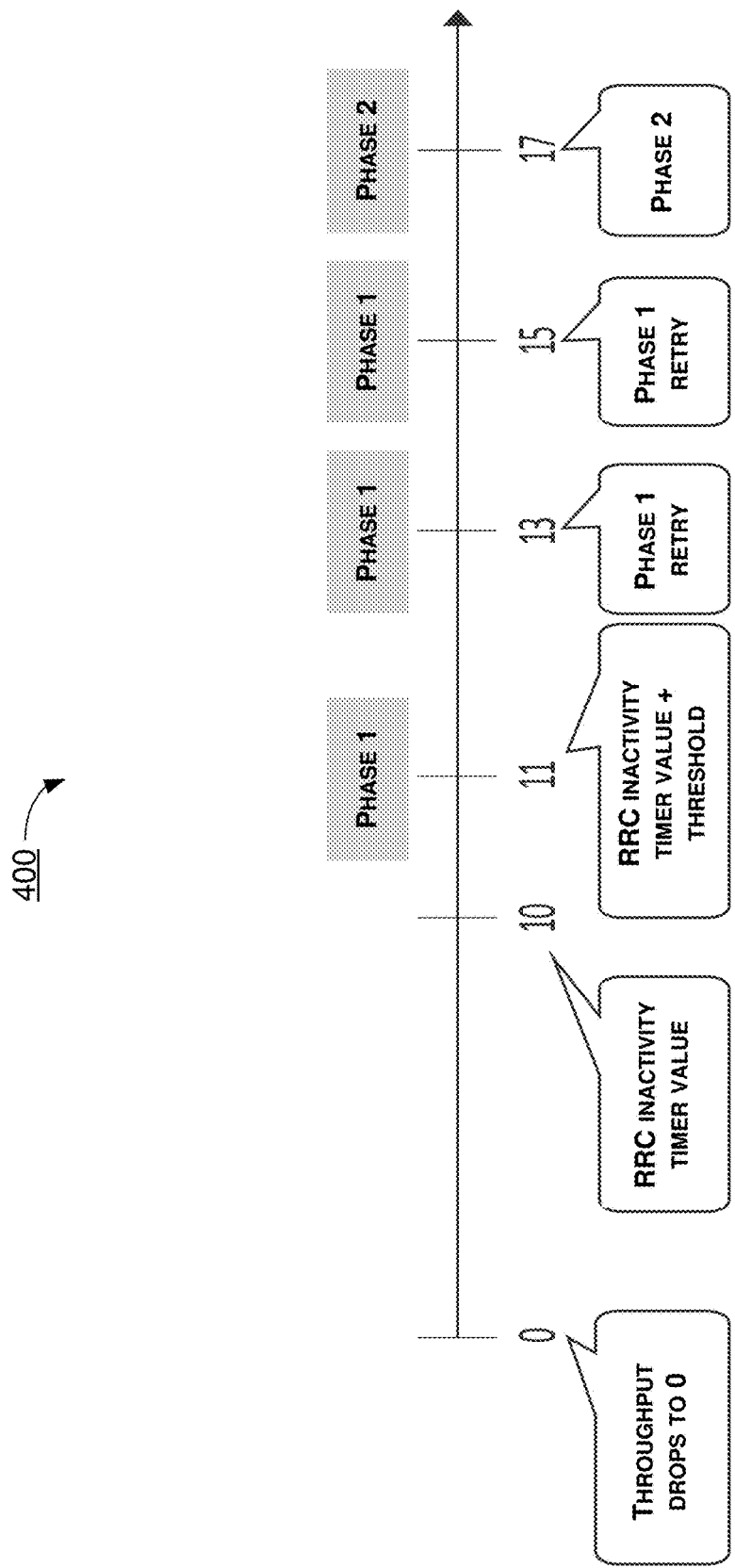
FIG. 4 is a diagram of an example scenario under a proposed scheme in accordance with the present disclosure.

FIG. 4 illustrates an example scenario 400 under a proposed scheme in accordance with the present disclosure. Under the proposed scheme, UE 110 may adaptively trigger an RRC connection release. Referring to FIG. 4, the adaptive UE-triggering of RRC connection release may take place in either Phase 1 or Phase 2. It is noteworthy that, under the proposed scheme with respect to adaptive UE-triggering of RRC connection release, the RRC inactivity timer may be learned (e.g., using the above-described proposed scheme (s)) or predefined (e.g., 10 seconds).

Phase 1 involves UE 110 triggering network 130 to release RRC connection. The timing of Phase 1 may be when the duration of zero-throughput is longer than a duration of "RRC inactivity timer+Phase-1 threshold", where the Phase-1 threshold may be 1 second or a different duration. In case that network 130 supports UAI with a releasePreference-r16 parameter, UE 110 may send UAI with the releasePreference-r16 parameter to trigger network 130 to release the RRC connection. Otherwise, UE 110 may send a fake A2 measurement report (e.g., indicating that signals from a serving cell has fallen below a respective threshold) to network 130 to trigger network 130 to release the RRC connection. It is noteworthy that Phase 1 may be repeated or otherwise reattempted several times based on a timer or scheduler.

Please 2 involves UE 110 performing a local release. The timing of Phase 2 may be: (1) when the duration of zero-throughput is longer than a duration of "RRC inactivity timer+Phase-2 threshold", where the Phase-2 threshold may be 6 seconds or a different duration, and/or (2) when Phase 1 has been repeated or retried for a certain number of times (e.g., three times or a different number of times). Under the proposed scheme, in Phase 2, UE 110 may locally release the RRC connection without waiting for a signaling message from network 130.

Under the proposed scheme, adaptive UE-triggering of RRC connection release may be skipped under any of a number of conditions/scenarios. Such conditions/scenarios may include, for example and without limitation: (1) an existence of low-layer failure (e.g., out of service), (2) UE 110 being charged, (3) a hand of a user gripping UE 110, (4) UE 110 being in a special test (e.g., free-to-air (FTA) mode or using a test subscriber identity module (SIM)), (5) a change of cell (e.g., handover or redirection), and (6) periodic or random instances (e.g., for observing whether a network timer has changed).

Figure 5:
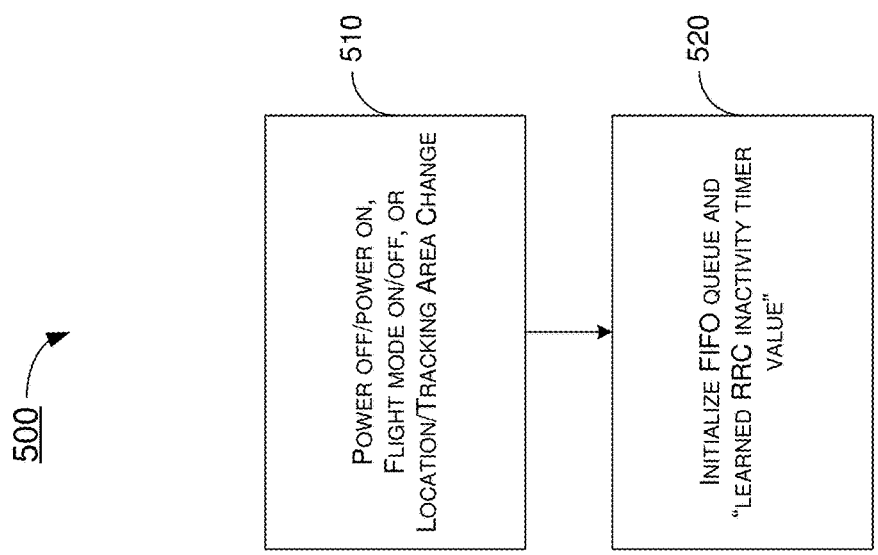
FIG. 5 is a diagram of an example design under a proposed scheme in accordance with the present disclosure.

FIG. 5 illustrates an example design 500 under a proposed scheme in accordance with the present disclosure. Design 500 may involve a flow of various operations pertaining to one or more of the proposed schemes described above. Referring to FIG. 5, at 510, UE 110 may experience any one of certain predefined scenarios such as, for example and without limitation, power-off and power-on (e.g., power cycling of UE 110), switching into and out of a flight mode (during which mobile communication is deactivated), and change of a location area or tracking area of UE 110 (e.g., due to movement of UE 110). As a result of the experiencing of one of the predefined scenarios, at 520, UE 110 may reset or otherwise initialize the FIFO queue as well as the learned RRC inactivity timer duration (e.g., by setting each to 0).

Figure 6:
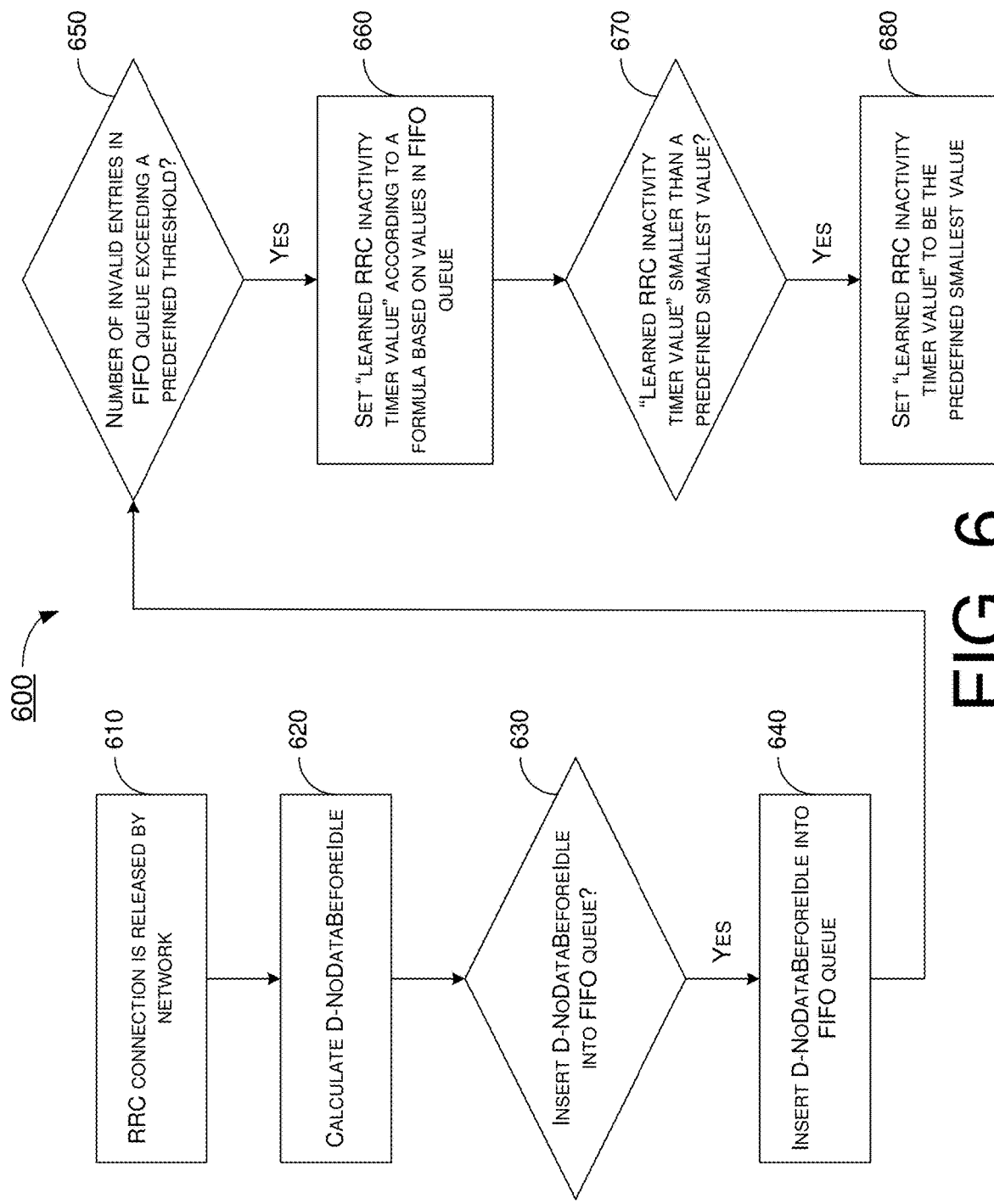
FIG. 6 is a diagram of an example design under a proposed scheme in accordance with the present disclosure.

FIG. 6 illustrates an example design 600 under a proposed scheme in accordance with the present disclosure. Design 600 may involve a flow of various operations pertaining to one or more of the proposed schemes described above, such as learning the value of RRC inactivity timer of a network. Referring to FIG. 6, at 610, network 130 may release an RRC connection with UE 110. At 620, UE 110 may calculate or otherwise determine the D-NoDataBeforeIdle value. At 630, UE 110 may determine whether or not to insert and store the D-NoDataBeforeIdle value in a FIFO queue. For instance, UE 110 may determine not to insert or store a particular D-NoDataBeforeIdle value in the FIFO queue in case that the particular D-NoDataBeforeIdle value is less than a predefined lower bound value (e.g., 8 seconds). In response to a positive determination at 630, at 640, UE 110 may insert and store the D-NoDataBeforeIdle value in the FIFO queue. At 650, UE 110 may determine whether a number of invalid entries in the FIFO queue exceeds a predefined threshold. In response to a positive determination at 650, at 660, UE 110 may set a "learned RRC inactivity timer duration" according to a formula based on values in the FIFO queue. For instance, UE 110 may set the "learned RRC inactivity timer duration" based on the following expression: min (values stored in the FIFO queue)+an offset, where the offset may be 1 second or a different duration. At 670, UE 110 may determine whether the "learned RRC inactivity timer duration" is smaller or less than a predefined smallest value. In response to a positive determination at 670, at 680, UE 110 may set the "learned RRC inactivity timer duration" to be the predefined smallest value. For instance, in case that the calculated "learned RRC inactivity timer duration" is less than a predefined lower bound value (e.g., 8 seconds), the predefined lower bound value may be used as the "learned RRC inactivity timer duration." In response to a negative determination at each of 630, 650 and 670, the flow may end.

Figure 7:
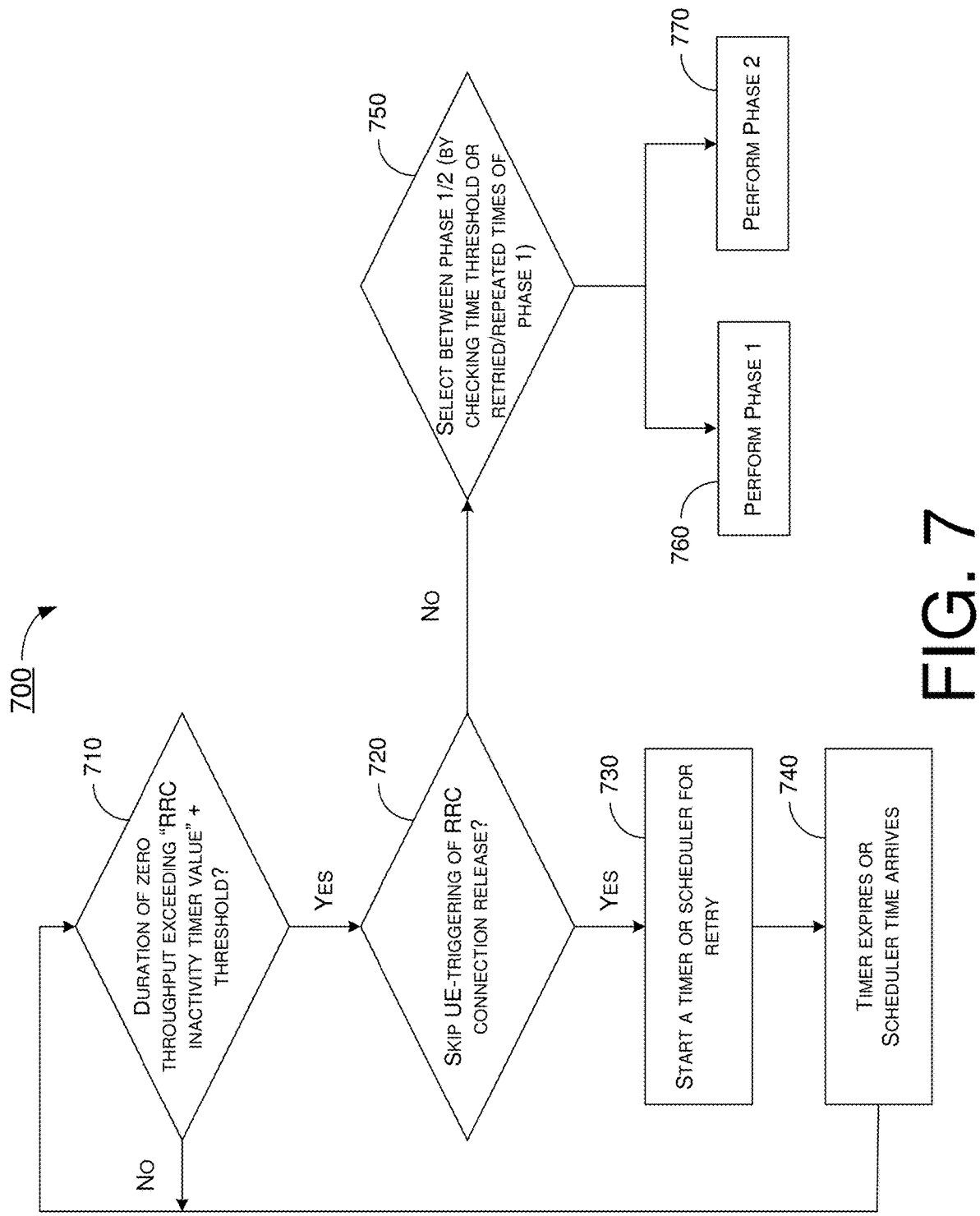
FIG. 7 is a diagram of an example design under a proposed scheme in accordance with the present disclosure.

FIG. 7 illustrates an example design 700 under a proposed scheme in accordance with the present disclosure. Design 700 may involve a flow of various operations pertaining to one or more of the proposed schemes described above, such as adaptive UE-triggering of RRC connection release. Referring to FIG. 7, at 710, network 130 may determine whether a duration of zero UL and DL throughput exceeds or is longer than a value of "RRC inactivity timer duration"+ Phase-1 threshold. The "RRC inactivity timer duration" may be a predefined value (e.g., 10 seconds) or learned as described above (e.g., the "learned RRC inactivity timer duration"). In response to a negative determination, the flow may return to 710. In response to a positive determination at 710, at 720, UE 110 may determine whether to skip a UE-triggering of an RRC connection release. In response to a positive determination at 720, at 730, UE 110 may start a timer or a scheduler used for retrying. At 740, upon expiry of the timer or upon arrival of a predetermined time of the scheduler, the flow may proceed to 710 to determine whether a duration of zero UL and DL throughput exceeds or is longer than a value of "RRC inactivity timer duration"+ Phase-1 threshold, and the flow may continue from there as described above. In response to a negative determination at 720, at 750, UE 110 may select between Phase 1 and Phase 2 by checking a time threshold or a number of times that Phase 1 has been retried or otherwise reattempted. Based on a determination at 750, UE 110 may proceed to 760 to perform operations related to Phase 1 as described above or proceed to 770 to perform operations related to Phase 2 as described above.

Illustrative Implementations

Figure 8:
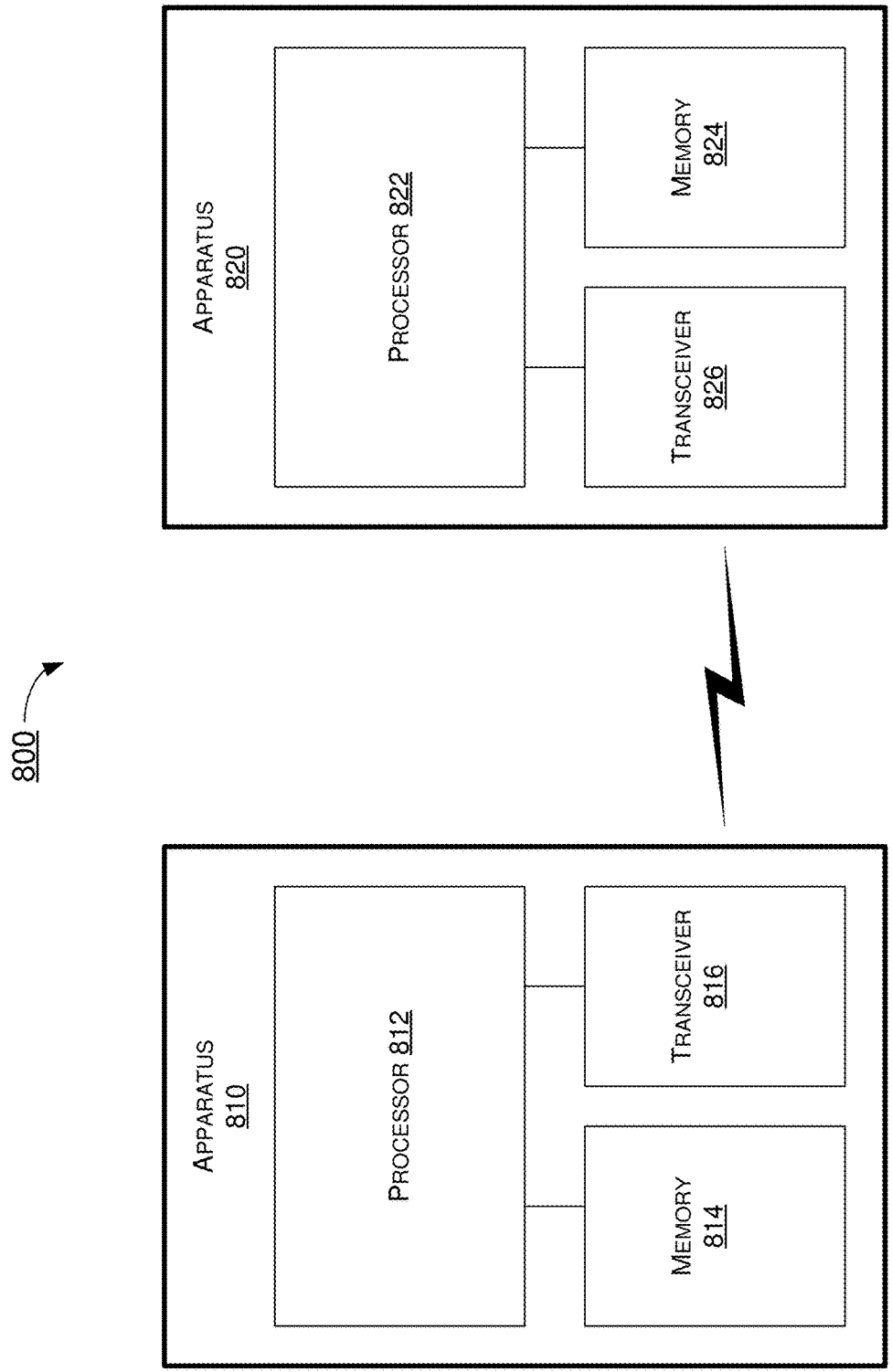
FIG. 8 is a block diagram of an example communication system in accordance with an implementation of the present disclosure.

FIG. 8 illustrates an example communication system 800 having at least an example apparatus 810 and an example apparatus 820 in accordance with an implementation of the present disclosure. Each of apparatus 810 and apparatus 820 may perform various functions to implement schemes, techniques, processes and methods described herein pertaining to power saving by RRC inactivity timer online learning and adaptive RRC connection release in wireless communications, including the various schemes described above with respect to various proposed designs, concepts, schemes, systems and methods described above, including network environment 100, as well as processes described below.

Each of apparatus 810 and apparatus 820 may be a part of an electronic apparatus, which may be a network apparatus or a UE (e.g., UE 110), such as a portable or mobile apparatus, a wearable apparatus, a vehicular device or a vehicle, a wireless communication apparatus or a computing apparatus. For instance, each of apparatus 810 and apparatus 820 may be implemented in a smartphone, a smart watch, a personal digital assistant, an electronic control unit (ECU) in a vehicle, a digital camera, or a computing equipment such as a tablet computer, a laptop computer or a notebook computer. Each of apparatus 810 and apparatus 820 may also be a part of a machine type apparatus, which may be an IoT apparatus such as an immobile or a stationary apparatus, a home apparatus, a roadside unit (RSU), a wire communication apparatus or a computing apparatus. For instance, each of apparatus 810 and apparatus 820 may be implemented in a smart thermostat, a smart fridge, a smart door lock, a wireless speaker or a home control center. When implemented in or as a network apparatus, apparatus 810 and/or apparatus 820 may be implemented in an eNodeB in an LTE, LTE-Advanced or LTE-Advanced Pro network or in a gNB or TRP in a 5G network, an NR network or an IoT network.

In some implementations, each of apparatus 810 and apparatus 820 may be implemented in the form of one or more integrated-circuit (IC) chips such as, for example and without limitation, one or more single-core processors, one or more multi-core processors, one or more complex-instruction-set-computing (CISC) processors, or one or more reduced-instruction-set-computing (RISC) processors. In the various schemes described above, each of apparatus 810 and apparatus 820 may be implemented in or as a network apparatus or a UE. Each of apparatus 810 and apparatus 820 may include at least some of those components shown in FIG. 8 such as a processor 812 and a processor 822, respectively, for example. Each of apparatus 810 and apparatus 820 may further include one or more other components not pertinent to the proposed scheme of the present disclosure (e.g., internal power supply, display device and/or user interface device), and, thus, such component(s) of apparatus 810 and apparatus 820 are neither shown in FIG. 8 nor described below in the interest of simplicity and brevity.

In one aspect, each of processor 812 and processor 822 may be implemented in the form of one or more single-core processors, one or more multi-core processors, or one or more CISC or RISC processors. That is, even though a singular term "a processor" is used herein to refer to processor 812 and processor 822, each of processor 812 and processor 822 may include multiple processors in some implementations and a single processor in other implementations in accordance with the present disclosure. In another aspect, each of processor 812 and processor 822 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, each of processor 812 and processor 822 is a special-purpose machine specifically designed, arranged and configured to perform specific tasks including those pertaining to power saving by RRC inactivity timer online learning and adaptive RRC connection release in wireless communications in accordance with various implementations of the present disclosure.

In some implementations, apparatus 810 may also include a transceiver 816 coupled to processor 812. Transceiver 816 may be capable of wirelessly transmitting and receiving data. In some implementations, transceiver 816 may be capable of wirelessly communicating with different types of wireless networks of different radio access technologies (RATs). In some implementations, transceiver 816 may be equipped with a plurality of antenna ports (not shown) such as, for example, four antenna ports. That is, transceiver 816 may be equipped with multiple transmit antennas and multiple receive antennas for multiple-input multiple-output (MIMO) wireless communications. In some implementations, apparatus 820 may also include a transceiver 826 coupled to processor 822. Transceiver 826 may include a transceiver capable of wirelessly transmitting and receiving data. In some implementations, transceiver 826 may be capable of wirelessly communicating with different types of UEs/wireless networks of different RATs. In some implementations, transceiver 826 may be equipped with a plurality of antenna ports (not shown) such as, for example, four antenna ports. That is, transceiver 826 may be equipped with multiple transmit antennas and multiple receive antennas for MIMO wireless communications.

In some implementations, apparatus 810 may further include a memory 814 coupled to processor 812 and capable of being accessed by processor 812 and storing data therein. In some implementations, apparatus 820 may further include a memory 824 coupled to processor 822 and capable of being accessed by processor 822 and storing data therein. Each of memory 814 and memory 824 may include a type of random-access memory (RAM) such as dynamic RAM (DRAM), static RAM (SRAM), thyristor RAM (T-RAM) and/or zero-capacitor RAM (Z-RAM). Alternatively, or additionally, each of memory 814 and memory 824 may include a type of read-only memory (ROM) such as mask ROM, programmable ROM (PROM), erasable programmable ROM (EPROM) and/or electrically erasable programmable ROM (EEPROM). Alternatively, or additionally, each of memory 814 and memory 824 may include a type of non-volatile random-access memory (NVRAM) such as flash memory, solid-state memory, ferroelectric RAM (Fe-RAM), magnetoresistive RAM (MRAM) and/or phase-change memory.

Each of apparatus 810 and apparatus 820 may be a communication entity capable of communicating with each other using various proposed schemes in accordance with the present disclosure. For illustrative purposes and without limitation, a description of capabilities of apparatus 810, as a UE (e.g., UE 110), and apparatus 820, as a network node (e.g., terrestrial network node 125 or non-terrestrial network node 128) of a network (e.g., network 130 as a 5G/NR mobile network), is provided below in the context of example processes 900 and 1000.

Illustrative Processes

Figure 9:
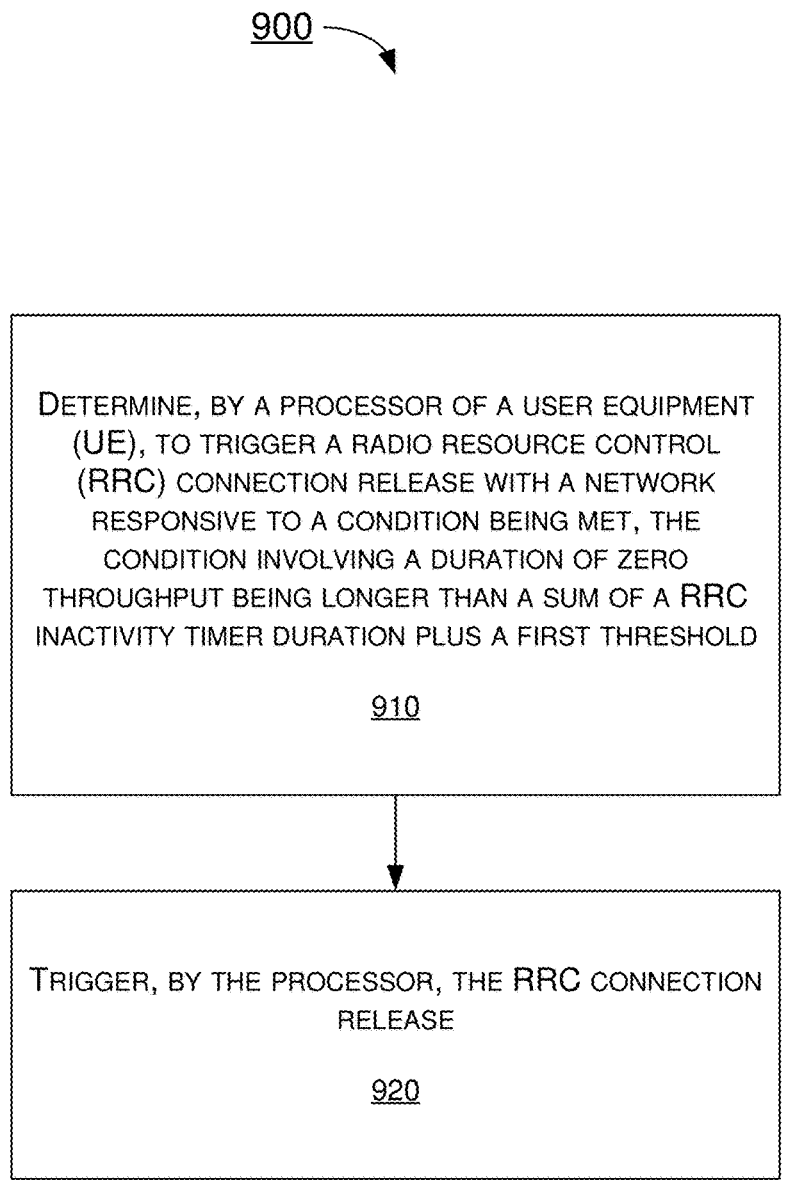
FIG. 9 is a flowchart of an example process in accordance with an implementation of the present disclosure.

FIG. 9 illustrates an example process 900 in accordance with an implementation of the present disclosure. Process 900 may represent an aspect of implementing various proposed designs, concepts, schemes, systems and methods described above, whether partially or entirely, including those pertaining to those described above. More specifically, process 900 may represent an aspect of the proposed concepts and schemes pertaining to power saving by RRC inactivity timer online learning and adaptive RRC connection release in wireless communications. Process 900 may include one or more operations, actions, or functions as illustrated by one or more of blocks 910 and 920. Although illustrated as discrete blocks, various blocks of process 900 may be divided into additional blocks, combined into fewer blocks, or eliminated, depending on the desired implementation. Moreover, the blocks/sub-blocks of process 900 may be executed in the order shown in FIG. 9 or, alternatively, in a different order. Furthermore, one or more of the blocks/sub-blocks of process 900 may be executed iteratively. Process 900 may be implemented by or in apparatus 810 and apparatus 820 as well as any variations thereof. Solely for illustrative purposes and without limiting the scope, process 900 is described below in the context of apparatus 810 as a UE (e.g., UE 110) and apparatus 820 as a communication entity such as a network node or base station (e.g., terrestrial network node 125 or non-terrestrial network node 128) of a network (e.g., network 130 as a 5G/NR mobile network). Process 900 may begin at block 910.

At 910, process 900 may involve processor 812 of apparatus 810 determining to trigger an RRC connection release with a network (e.g., network 130 via apparatus 820) responsive to a condition being met. The condition may involve a duration of zero throughput being longer than a sum of a RRC inactivity timer duration plus a first threshold (e.g., Phase-1 threshold). Process 900 may proceed from 910 to 920.

At 920, process 900 may involve processor 812 triggering, via transceiver 816, the RRC connection release.

In some implementations, in triggering the RRC connection release, process 900 may involve processor 812 either: (a) triggering the network to release a RRC connection with the UE; or (b) performing a local release after one or more times of attempting to trigger the network to release the RRC connection.

In some implementations, in triggering the network to release the RRC connection, process 900 may involve processor 812 transmitting UAI with a parameter to the network. Alternatively, or additionally, in triggering the network to release the RRC connection, process 900 may involve processor 812 transmitting a measurement report (e.g., a fake A2 measurement report) to the network indicating that signals from a serving cell has fallen below a respective threshold. Alternatively, or additionally, in triggering the network to release the RRC connection, process 900 may involve processor 812 repeating the triggering of the network to release the RRC connection multiple times until expiry of a timer or until a time of scheduler having been reached.

In some implementations, in performing the local release, process 900 may involve processor 812 performing the local release responsive to the duration of zero throughput being longer than the sum of the RRC inactivity timer duration plus a second threshold (e.g., Phase-2 threshold), which is greater than the first threshold.

In some implementations, the RRC inactivity timer duration may be predefined or learned by the UE.

In some implementations, responsive to the RRC inactivity timer duration being learned by the UE, process 900 may further involve processor 812 performing additional operations. For instance, process 900 may involve processor 812 maintaining a FIFO queue of a plurality of values each representative of a respective continuous duration of no UL and DL data before an RRC state transition from a connected state to an idle state (D-NoDataBeforeIdle). Moreover, the values stored in the FIFO queue may be used to determine a learned RRC inactivity timer duration which is used in determining to trigger the RRC connection release.

In some implementations, a value representative of the learned RRC inactivity timer duration may be stored in an NV along with location information (e.g., LAI/TAIU/PLMN).

In some implementations, in maintain the FIFO queue, process 900 may involve processor 812 not storing a respective value representative of a specific D-NoDataBeforeIdle in the FIFO queue responsive to any of the following: (a) a respective RRC idle state being triggered by the UE; (b) a lower-layer failure during the specific D-NoDataBeforeIdle; and (c) no user data being transmitted during an RRC connection period which is established for signaling.

In some implementations, responsive to a number of stored values in the FIFO queue exceeding a predefined threshold, process 900 may further involve processor 812 performing additional operations. For instance, process 900 may involve processor 812 calculating the learned RRC inactivity timer duration based on a mathematical expression of min (values stored in the FIFO queue)+an offset.

In some implementations, in calculating, process 900 may involve processor 812 performing certain operations. For instance, process 900 may involve processor 812 dropping a predetermined percentage of minimal values stored in the FIFO queue before the calculating. Additionally, process 900 may involve processor 812 calculating the learned RRC inactivity timer duration based on the mathematical expression.

In some implementations, responsive to a number of stored values in the FIFO queue exceeding a predefined threshold, process 900 may further involve processor 812 determining the learned RRC inactivity timer duration by setting a predefined lower bound value as the learned RRC inactivity timer duration.

In some implementations, process 900 may further involve processor 812 resetting the FIFO queue in response to any of the following: (a) a change in a location of the UE; (b) powering off and on of the UE; and (c) the UE entering a flight mode. In some implementations, the learned RRC inactivity timer duration may be considered invalid responsive to the FIFO queue being reset.

Figure 10:
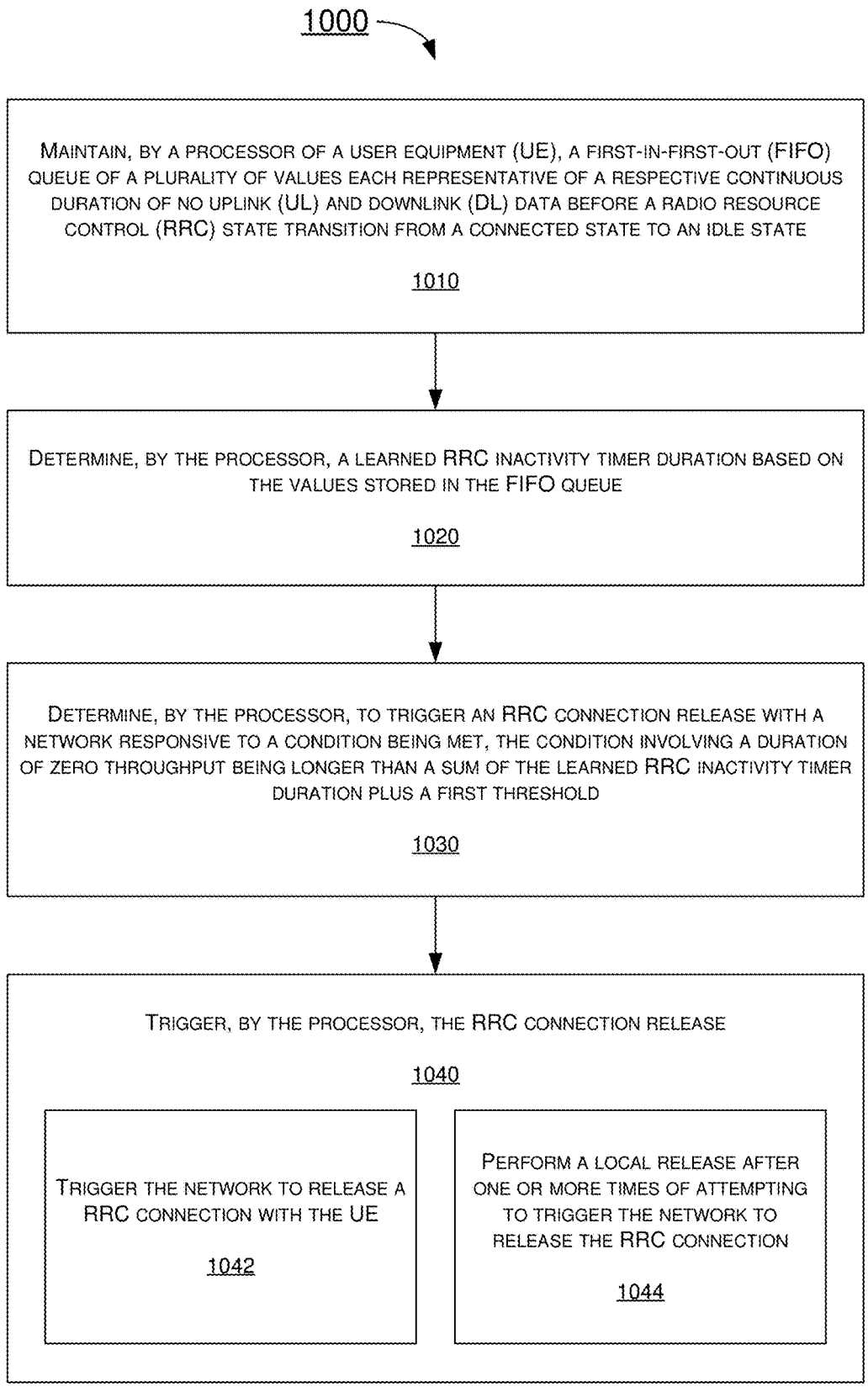
FIG. 10 is a flowchart of an example process in accordance with an implementation of the present disclosure.

FIG. 10 illustrates an example process 1000 in accordance with an implementation of the present disclosure. Process 1000 may represent an aspect of implementing various proposed designs, concepts, schemes, systems and methods described above, whether partially or entirely, including those pertaining to those described above. More specifically, process 1000 may represent an aspect of the proposed concepts and schemes pertaining to power saving by RRC inactivity timer online learning and adaptive RRC connection release in wireless communications. Process 1000 may include one or more operations, actions, or functions as illustrated by one or more of blocks 1010, 1020, 1030 and 1040 as well as subblocks 1042 and 1044. Although illustrated as discrete blocks, various blocks of process 1000 may be divided into additional blocks, combined into fewer blocks, or eliminated, depending on the desired implementation. Moreover, the blocks/sub-blocks of process 1000 may be executed in the order shown in FIG. 10 or, alternatively in a different order. Furthermore, one or more of the blocks/sub-blocks of process 1000 may be executed iteratively. Process 1000 may be implemented by or in apparatus 810 and apparatus 820 as well as any variations thereof. Solely for illustrative purposes and without limiting the scope, process 1000 is described below in the context of apparatus 810 as a UE (e.g., UE 110) and apparatus 820 as a communication entity such as a network node or base station (e.g., terrestrial network node 125 or non-terrestrial network node 128) of a network (e.g., network 130 as a 5G/NR mobile network). Process 1000 may begin at block 1010.

At 1010, process 1000 may involve processor 812 of apparatus 810 maintaining a FIFO queue of a plurality of values each representative of a respective continuous duration of no UL and DL data before an RRC state transition from a connected state to an idle state (D-NoDataBeforeIdle). Process 1000 may proceed from 1010 to 1020.

At 1020, process 1000 may involve processor 812 determining a learned RRC inactivity timer duration based on the values stored in the FIFO queue. Process 1000 may proceed from 1020 to 1030.

At 1030, process 1000 may involve processor 812 determining to trigger an RRC connection release with a network responsive to a condition being met. The condition may involve a duration of zero throughput being longer than a sum of the learned RRC inactivity timer duration plus a first threshold. Process 1000 may proceed from 1030 to 1040.

At 1040, process 1000 may involve processor 812 triggering, via transceiver 816, the RRC connection release by performing either of operations represented by 1042 and 1044.

At 1042, process 1000 may involve processor 812 triggering the network to release a RRC connection with the UE.

At 1044, process 1000 may involve processor 812 performing a local release after one or more times of attempting to trigger the network to release the RRC connection.

In some implementations, in triggering the network to release the RRC connection, process 1000 may involve processor 812 transmitting UAI with a parameter to the network. Alternatively, process 1000 may involve processor 812 transmitting a measurement report (e.g., a fake A2 measurement report) to the network indicating that signals from a serving cell has fallen below a respective threshold.

In some implementations, in triggering the network to release the RRC connection, process 1000 may involve processor 812 repeating the triggering of the network to release the RRC connection multiple times until expiry of a timer or until a time of scheduler having been reached.

In some implementations, in performing the local release, process 1000 may involve processor 812 performing the local release responsive to the duration of zero throughput being longer than the sum of the RRC inactivity timer duration plus a second threshold, and wherein the second threshold is greater than the first threshold.

ADDITIONAL NOTES

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method, comprising:
    determining, by a processor of a user equipment (UE), to trigger a radio resource control (RRC) connection release with a network responsive to a condition being met; and
    triggering, by the processor, the RRC connection release,
    wherein the condition comprises a duration of zero throughput being longer than a sum of a RRC inactivity timer duration plus a first threshold,
    wherein the triggering of the RRC connection release comprises performing a local release after one or more times of attempting to trigger the network to release the RRC connection,
    wherein the performing of the local release comprises performing the local release responsive to the duration of zero throughput being longer than the sum of the RRC inactivity timer duration plus a second threshold, and
    wherein the second threshold is greater than the first threshold.

2. The method of claim 1, wherein the triggering of the network to release the RRC connection comprises transmitting UE assistance information (UAI) with a parameter to the network.

3. The method of claim 1, wherein the triggering of the network to release the RRC connection comprises transmitting a measurement report to the network indicating that signals from a serving cell has fallen below a respective threshold.

4. The method of claim 1, wherein the triggering of the network to release the RRC connection comprises repeating the triggering of the network to release the RRC connection multiple times until expiry of a timer or until a time of scheduler having been reached.

5. The method of claim 1, wherein the RRC inactivity timer duration is predefined or learned by the UE.

6. The method of claim 5, responsive to the RRC inactivity timer duration being learned by the UE, further comprising:

maintaining a first-in-first-out (FIFO) queue of a plurality of values each representative of a respective continuous duration of no uplink (UL) and downlink (DL) data before an RRC state transition from a connected state to an idle state (D-NoDataBeforeIdle),
    wherein the values stored in the FIFO queue are used to determine a learned RRC inactivity timer duration which is used in determining to trigger the RRC connection release.

7. The method of claim 6, wherein a value representative of the learned RRC inactivity timer duration is stored in a network vector (NV) along with location information.

8. The method of claim 6, wherein the maintain of the FIFO queue comprises not storing a respective value representative of a specific D-NoDataBeforeIdle in the FIFO queue responsive to:
    a respective RRC idle state being triggered by the UE; or
    a lower-layer failure during the specific D-NoDataBeforeIdle; or
    no user data being transmitted during an RRC connection period which is established for signaling.

9. The method of claim 6, responsive to a number of stored values in the FIFO queue exceeding a predefined threshold, further comprising:
    calculating the learned RRC inactivity timer duration based on a mathematical expression of min (values stored in the FIFO queue)+an offset.

10. The method of claim 9, wherein the calculating comprises:
    dropping a predetermined percentage of minimal values stored in the FIFO queue before the calculating; and
    calculating the learned RRC inactivity timer duration based on the mathematical expression.

11. The method of claim 6, responsive to a number of stored values in the FIFO queue exceeding a predefined threshold, further comprising:
    determining the learned RRC inactivity timer duration by setting a predefined lower bound value as the learned RRC inactivity timer duration.

12. The method of claim 6, further comprising:
    resetting the FIFO queue responsive to:
    a change in a location of the UE; or
    powering off and on of the UE; or
    the UE entering a flight mode.

13. The method of claim 12, wherein the learned RRC inactivity timer duration is considered invalid responsive to the FIFO queue being reset.

14. A method, comprising:
    maintaining, by a processor of a user equipment (UE), a first-in-first-out (FIFO) queue of a plurality of values each representative of a respective continuous duration of no uplink (UL) and downlink (DL) data before a radio resource control (RRC) state transition from a connected state to an idle state;
    determining, by the processor, a learned RRC inactivity timer duration based on the values stored in the FIFO queue;
    determining, by the processor, to trigger an RRC connection release with a network responsive to a condition being met; and
    triggering, by the processor, the RRC connection release by:
    triggering the network to release a RRC connection with the UE; or
    performing a local release after one or more times of attempting to trigger the network to release the RRC connection, wherein the condition comprises a duration of zero throughput being longer than a sum of the learned RRC inactivity timer duration plus a first threshold.

15. The method of claim 14, wherein the triggering of the network to release the RRC connection comprises:
transmitting UE assistance information (UAI) with a parameter to the network; or
transmitting a measurement report to the network indicating that signals from a serving cell has fallen below a respective threshold.

16. The method of claim 14, wherein the triggering of the network to release the RRC connection comprises repeating the triggering of the network to release the RRC connection multiple times until expiry of a timer or until a time of scheduler having been reached.

17. The method of claim 14, wherein the performing of the local release comprises performing the local release responsive to the duration of zero throughput being longer than the sum of the RRC inactivity timer duration plus a second threshold, and wherein the second threshold is greater than the first threshold.

18. An apparatus implementable in a user equipment (UE), comprising:
a transceiver configured to communicate wirelessly; and
a processor coupled to the transceiver and configured to perform operations comprising:
determining to trigger a radio resource control (RRC) connection release with a network responsive to a condition being met; and
triggering, via the transceiver, the RRC connection release,
wherein the condition comprises a duration of zero throughput being longer than a sum of a RRC inactivity timer duration plus a first threshold,
wherein the triggering of the RRC connection release comprises performing a local release after one or more times of attempting to trigger the network to release the RRC connection,
wherein the performing of the local release comprises performing the local release responsive to the duration of zero throughput being longer than the sum of the RRC inactivity timer duration plus a second threshold, and
wherein the second threshold is greater than the first threshold.

* * * * *